United States Patent
Sauer

(10) Patent No.: US 8,062,107 B1
(45) Date of Patent: Nov. 22, 2011

(54) HUNTING TOOL

(76) Inventor: Curtis R. Sauer, Avon, MN (US)

( * ) Notice: Subject to any disclaimer, the term of this patent is extended or adjusted under 35 U.S.C. 154(b) by 0 days.

(21) Appl. No.: 12/548,627

(22) Filed: Aug. 27, 2009

Related U.S. Application Data

(60) Provisional application No. 61/092,385, filed on Aug. 27, 2008.

(51) Int. Cl.
*A22B 5/06* (2006.01)
(52) U.S. Cl. .................................................... 452/197
(58) Field of Classification Search .......... 452/189–192;
294/81.1, 81.2, 81.21, 81.3, 67.4, 74, 81.5,
294/81.56, 82.1, 81.54
See application file for complete search history.

(56) References Cited

U.S. PATENT DOCUMENTS

| | | | |
|---|---|---|---|
| 12,222 A | 1/1855 | Tesh | |
| 370,615 A | 9/1887 | Folger | |
| 1,172,489 A | 2/1916 | Schellinger | |
| 2,270,857 A | 1/1942 | De Moss | |
| 4,828,307 A * | 5/1989 | Sokol et al. | 452/192 |
| 4,901,397 A | 2/1990 | Pursell et al. | |
| 5,087,019 A * | 2/1992 | Peabody et al. | 254/100 |
| 5,145,224 A * | 9/1992 | Welk | 294/2 |
| 5,360,368 A | 11/1994 | Hajek | |
| 5,697,891 A * | 12/1997 | Hori | 600/245 |
| 5,707,281 A * | 1/1998 | Hicks | 452/197 |
| 6,019,403 A * | 2/2000 | Corbett | 294/1.1 |
| 6,059,649 A | 5/2000 | Ballard | |
| 6,186,882 B1 * | 2/2001 | Adams et al. | 452/189 |
| 6,199,828 B1 | 3/2001 | Komperud | |
| 6,361,492 B1 * | 3/2002 | Santilli | 600/205 |
| 6,682,412 B2 | 1/2004 | Hendrix | |
| 6,729,666 B2 * | 5/2004 | Mullis | 294/81.56 |
| 6,743,170 B1 * | 6/2004 | Spence et al. | 600/210 |
| 7,125,331 B1 * | 10/2006 | Sayers | 452/189 |
| 7,288,065 B1 * | 10/2007 | Taylor et al. | 600/232 |
| 7,294,103 B2 * | 11/2007 | Bertolero et al. | 600/207 |

* cited by examiner

*Primary Examiner* — Thomas Price
(74) *Attorney, Agent, or Firm* — Albert W. Watkins

(57) ABSTRACT

A hunting tool for facilitating dragging an animal carcass to a field dressing location or from the field, and for spreading open the rib cage of an animal carcass during field dressing, is comprised by a generally parallelepiped body terminating in two bifurcated ends. The body may be provided with a contoured or conformal grip to assist with manipulation, and is preferably fabricated from a high density alkane hydrocarbon polymer, such as high density or UHMW polyethylene. Adjacent each of the bifurcated ends is a rope anchor, and a rope may be anchored thereon. The rope is used to engage the carcass during transport, using the hand grip to hold and pull the animal from a convenient height. The bifurcated ends are used during dressing to spread the rib cage.

20 Claims, 3 Drawing Sheets

HUNTING TOOL

CROSS REFERENCE TO RELATED APPLICATIONS

This application claims priority to U.S. provisional patent application Ser. No. 61/092,385 filed Aug. 27, 2008, the contents which are incorporated herein by reference in entirety.

BACKGROUND OF THE INVENTION

1. Field of the Invention

The present invention relates generally to a butchering device used in the treatment of carcasses, and more particularly to compact and portable devices that assist with the spreading, suspending, and transporting of carcasses such as are desired for field dressing after a successful hunt.

2. Description of the Related Art

At the conclusion of a successful hunt, it is highly desirable to dress the carcass as soon as possible after killing the animal. When one waits to dress the carcass, undesirable decomposition products accumulate and taint the meat, and the dressing process is more difficult and undesirable. Instead, at least preliminary dressing is preferably done in the field while the carcass is still warm and flexible, and rigor mortis has not yet set in.

One part of the dressing process is the removal of the viscera, including internal organs. In order to do so, the carcass will most preferably be stabilized with the rib cage held open. Holding the rib cage open increases view and access, so that a person can safely remove the appropriate contents. Suspending the animal carcass decreases the amount of interfering blood, and, with the ribs spread, improves access and decreases the likelihood of acquiring diseases from the animal. Additionally, propping the carcass with the ribs open expedites the cooling process and slows the growth and spread of bacteria on the inside of the carcass. To such an end, the carcass is often suspended by two limbs from a convenient tree branch, post or the like, and the rib cage is propped open.

There are numerous pre-existing approaches to spreading ribs. Several of the existing approaches involve pneumatically, hydraulically, and/or electrically driven devices, including U.S. Pat. Nos. 6,682,412 to Hendrix, entitled "Apparatus for Holding, Supporting, and Maneuvering an Animal Carcass While Holding Open the Rib Cage of the Carcass" and 6,199,828 to Komperud, entitled "Linear Spreader", the contents of each which are incorporated herein by reference for their teachings. Both patents illustrate a means for suspending a carcass and spreading the rib cage. However, both are undesirably large for transport during a hunt. Consequently, the carcass must first be transported to the equipment, resulting in undesirable decay and contamination. These devices provide no mechanism for moving the animal carcass either before or after the field dressing is complete, and dragging an animal carcass is awkward and can consume a great deal of time.

Another approach to dressing an animal carcass is found in U.S. Pat. Nos. 12,222 to F. Tesh, entitled "Beef Spreader"; 6,059,649 to Ballard, entitled "Rib Spreading Device and Method of Utilization"; 1,172,489 to G. M. Schellinger, entitled "Gambrel"; and 5,707,281 to Hicks, entitled "Game Carcass Spreader", the contents of each which are incorporated herein by reference for their teachings. These patents mechanically spread the carcass and have ratchet devices and the like which require manual releases, thereby holding the carcass apart as long as may be desirable. These patents do not address the need for transporting the carcass, and several have prongs or hooks which may be dangerous to a hunter, either during the hunt or during transportation or use.

More transportable mechanisms are found in U.S. Pat. Nos. 2,270,857 to L. De Moss, entitled "Carcass Spreader"; 5,087,019 to Peabody et al., entitled "Spreader Apparatus"; 6,186,882 to Adams et al, entitled "Animal Field Dressing Hanger"; 4,901,397 to Pursell et al., entitled "Carcass Spreader Device"; 5,360,368 to Hajek, entitled "Wild Game Dressing Tool"; 370,615 to J. Folger, entitled "Meat Spreader", the contents of each which are incorporated herein by reference for their teachings. These patents generally provide collapsible and/or more compact rib spreaders. However, these rib spreaders still lack any features to facilitate transporting the carcass.

Accordingly, there is a need for a compact and readily transportable apparatus that will allow one to spread the ribs of an animal carcass for field dressing or cooling that can additionally function as an aid for transporting an animal carcass to or from a field-dressing location. Such an apparatus in provided by the present invention.

In addition to the aforementioned patents, Webster's New Universal Unabridged Dictionary, Second Edition copyright 1983, is also incorporated herein by reference in entirety for the definitions of words and terms used herein.

SUMMARY OF THE INVENTION

In a first manifestation, the invention is a hunting tool that has in combination a rip spreader and an indeterminate length rope enabling both rib spreading and carcass transport. A longitudinally extensive body region has at least one rope anchor. A pair of bifurcated carcass-engaging braces terminate the longitudinally extensive body region distal from each other.

In a second manifestation, the invention is a rib spreader, comprising a longitudinally extensive body region having at least one rope anchor, and a pair of bifurcated carcass-engaging braces distal from each other and generally terminating the longitudinally extensive body region.

In a third manifestation, the invention is a hunting tool enabling both rib spreading and carcass transport. The hunting tool has a longitudinally extensive, generally parallelepiped body region. A pair of bifurcated carcass-engaging braces terminate the longitudinally extensive body region distal from each other. Each one of the bifurcated carcass-engaging braces terminate distal to the longitudinally extensive body region in a pair of gently curved forks. A first hole passes through the longitudinally extensive body region adjacent to a first one of the pair of bifurcated carcass-engaging braces. A second hole passes through the longitudinally extensive body region adjacent to a second one of the pair of bifurcated carcass-engaging braces. A flaccid cord passes through the first hole, extends away from the longitudinally extensive body region, and passes through the second hole.

OBJECTS OF THE INVENTION

Exemplary embodiments of the present invention solve inadequacies of the prior art by providing an improved hunting tool that serves the function of an animal carcass rib spreader and also facilitates dragging the animal to a suitable field dressing location.

A first object of the invention is to provide an animal carcass spreading and dragging hunting tool which is inexpensive, lightweight, and easy to use. A second object of the invention is to provide an animal carcass spreading and dragging hunting tool which is efficient and effective to use.

Another object of the present invention is to provide an animal carcass spreading and dragging hunting tool which is safe to carry during a hunt, and which is safe to use for field dressing. A further object of the invention is to provide an animal carcass spreading and dragging hunting tool which can be positioned at varying points along the rib cage to create varying sizes of openings or to selectively spread different sections of the carcass. Yet another object of the present invention is to provide an animal carcass spreading and dragging hunting tool which can be used in varying sizes of carcasses and which will stay properly positioned therein. A further object of the invention is to provide an animal carcass spreading and dragging hunting tool that is tough, chemical and stain-resistant, and which is easily cleaned.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
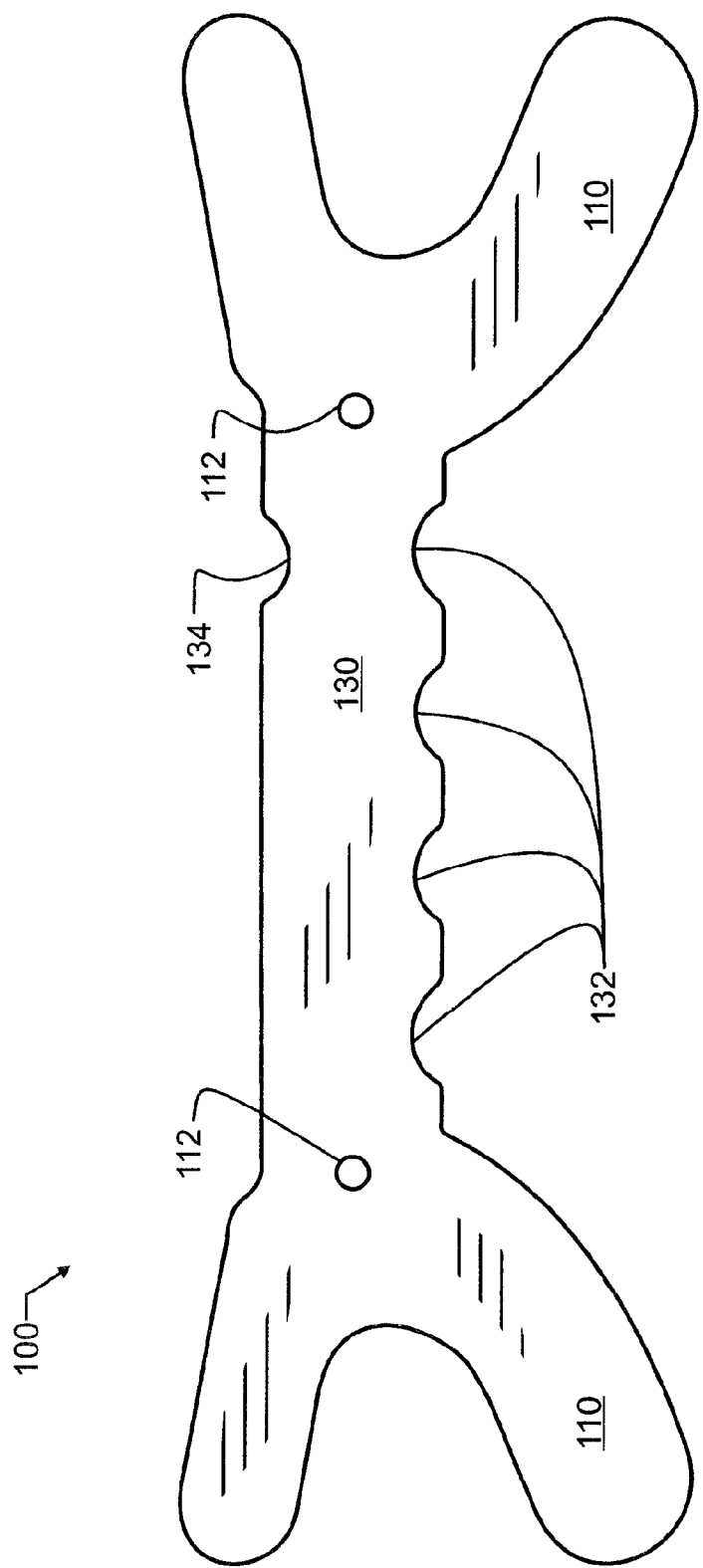
FIG. 1 illustrates a preferred embodiment hunting tool designed in accord with the teachings of the invention from front view.

In a most preferred embodiment of the invention illustrated in FIG. 1, a hunting tool 100 is comprised of a rigid and durable plastic bar 130 with a pair of distally located split or bifurcated braces 110. Hunting tool 100 is designed for use in combination with carcasses, in particular when hunting or butchering animals or livestock. Most preferably, hunting tool 100 acts as a rib brace for instances such as gutting a carcass or hanging a carcass to cool. As a rib brace, bifurcated braces 110 most preferably brace against and spread the rib bones and adjacent flesh of the carcass. In the preferred embodiment, plastic bar 130 is sized such that it spaces the bifurcated braces 110 apart and, consequently, holds the sides of the opening of a carcass apart. In view of the widely varying sizes of animals for which hunting tool 100 may have utility, it will be appreciated that plastic bar 130 may optionally be fabricated to either be adjustable in size, or may be fabricated in different sizes or proportions to be suitable for use in combination with very different carcass sizes.

Figure 2:
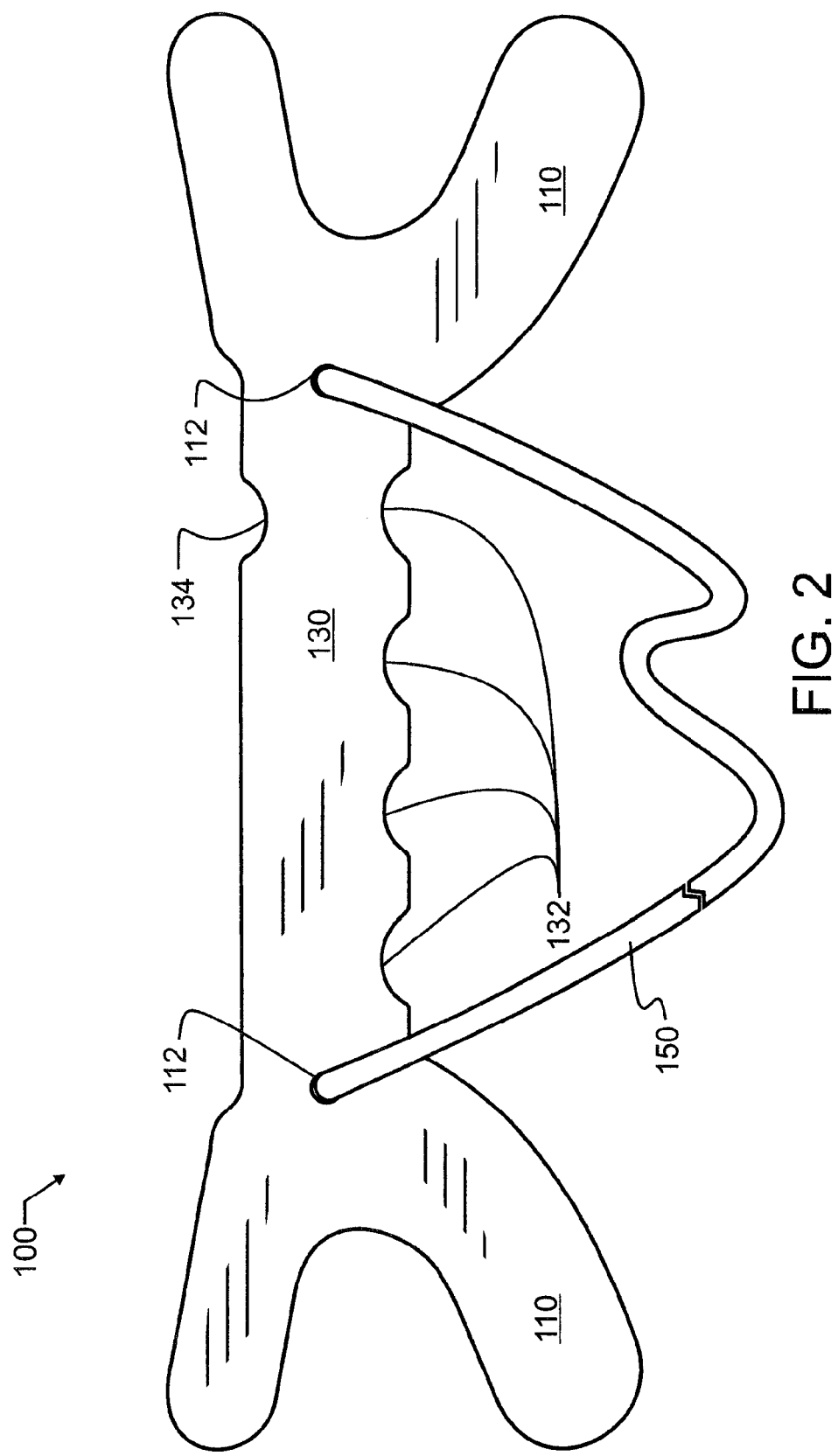
FIG. 2 illustrates the preferred embodiment hunting tool in a most preferred further combination with a rope from front view.

As illustrated in FIGS. 1 and 2, preferred embodiment hunting tool 100 has four notches on one side for finger holds 132 and a fifth notch on the opposing side for a thumb hold 134, providing a comfortable hand grip on plastic bar 130. In the preferred embodiment, these finger and thumb holds have been formed at the time of formation of hunting tool 100. By forming these notches, a hand grip is created which is more nearly contoured to a common human hand. Where desired, a hand grip which is more conformal may be provided using either more elaborate molds or patterning, or with the provision of conformal materials which may conform to or take the shape of a particular user. These conformal materials may be used as the entire substrate material, but may alternatively be used as a covering or overmold, or even a separate sleeve or the like installed about bar 130.

Most preferably, hunting tool 100 also has a hole 112 on either end of plastic bar 130 that is configured to receive a rope there through, and thereby serve as a rope anchor. While a hole is preferred for simplicity, it will be understood that a myriad of other apparatus are known for coupling to and anchoring a rope, and such apparatus will be understood to be incorporated herein. The combination hunting tool 100 and rope 150 is illustrated in FIG. 2. Rope 150 passes through holes 112 at either end, and is simply knotted adjacent each termination to prevent the rope from slipping back out of holes 112. Again, any number of suitable rope terminations may be used, and may for exemplary purposes only but not limited thereto include simple heat staking, melting and balling the ends of the rope, wedges driven into holes 112 with the rope therein, adhesives or other means adhering rope 150 to bar 130, balls or other objects too large to pass through holes 112 affixed adjacent the ends of the rope, or other like apparatus. When used in combination with the hand grip formed by finger holds 132 and thumb hold 134, rope 150 enables a user to utilize preferred embodiment hunting tool 100 as a multi-purpose tool. In addition to facilitating rib spreading, hunting tool 100 with rope 150 may also be used for dragging or otherwise moving a carcass. This rope is simply wrapped about the carcass, such as about the animal's neck, and then grasped about plastic bar 130 to pull the carcass from any convenient height or elevation above the ground.

Figure 3:
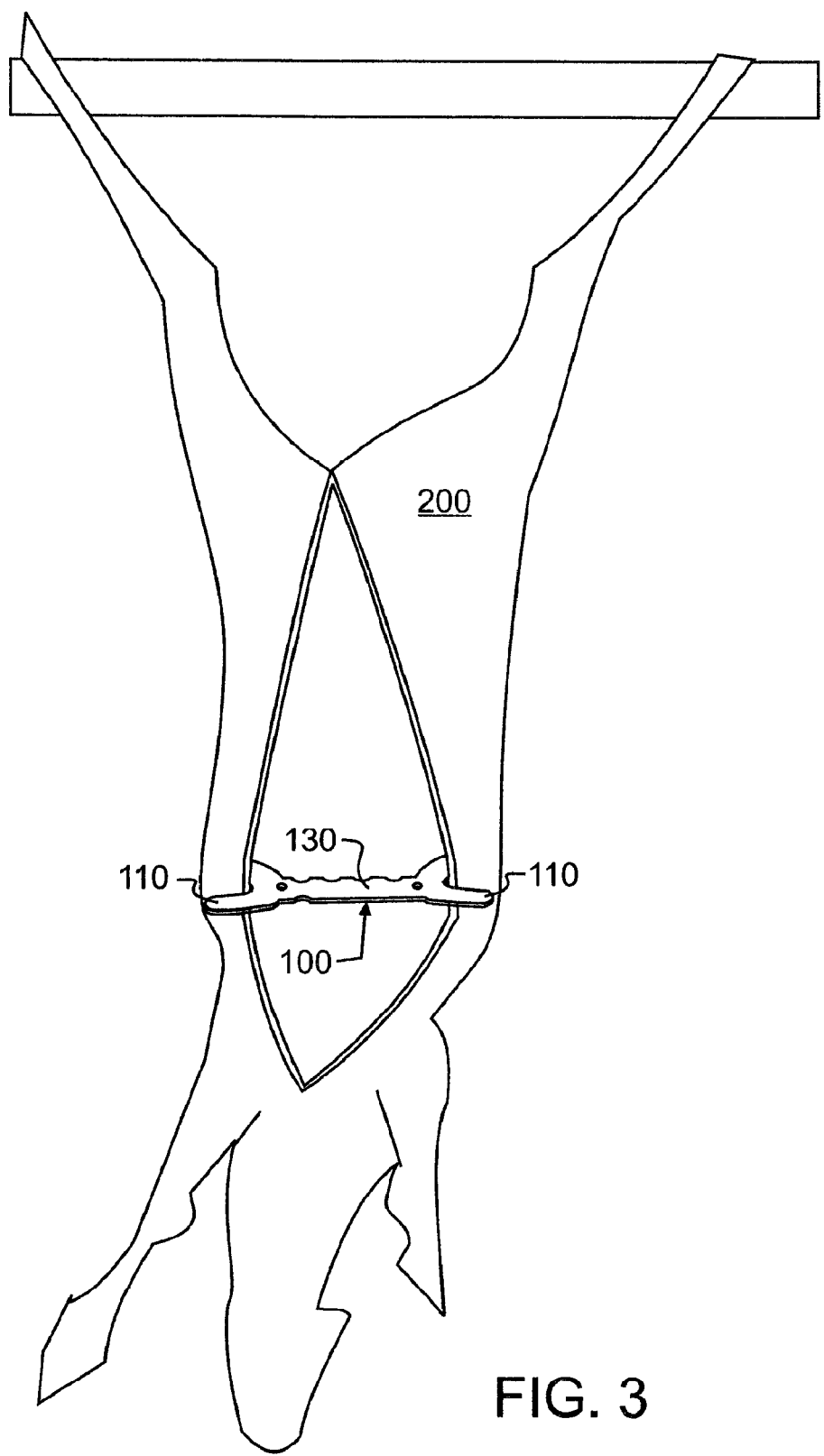
FIG. 3 illustrates the most preferred combination hunting tool of FIG. 1 in further combination with a suspended deer carcass.

FIG. 3 illustrates hunting tool 100 in the most preferred combination with a deer carcass 200. As can be seen from the figure, hunting tool 100 braces between the rib bones and holds the carcass open in such a manner as to allow a hunter to access the interior of the carcass. Frequently, this access will be used to eviscerate the deer. Most preferably, after gutting the deer, the hunting tool 100 is then used to keep the carcass open to allow air flow and increase the rate at which the carcass is cooled.

From these figures and the description, several additional features and options become more apparent. First of all, hunting tool 100 may be manufactured from a variety of materials, including metals, resins and plastics, ceramics or cementitious materials, woods, or even combinations, laminates, or composites of the above. The specific material used may vary, though special benefits are attainable if several important factors are taken into consideration. First, hunting tool 100 should be sufficiently light and compact to enable easy transportation for uses such as hunting, but also be sufficiently durable to withstand the weight of a several hundred pound carcass without consequential warping. Most preferably, hunting tool 100 will also be weather resistant and sufficiently durable to withstand the particular climate for the intended application, including any moisture that could tend to rust or rot certain materials. In addition, hunting tool 100 will also preferably withstand extremely cold and hot temperatures without adverse impact, so as to avoid cold cracking during winter hunts and softening or deformation if left in a hot vehicle. Additionally, resistance to abrasion from contact with such devices as gutting knives, potentially jagged bones, or even the ground may be preferable. For carrying, insertion, and storage convenience, bar 130 may also be a collapsible or telescoping bar, using techniques known in the mechanical arts. A material which is also chemically and biologically resistant and readily cleaned is highly desirable, since the carcasses may otherwise potentially contaminate the tool. In the preferred embodiment, this has been achieved using various aliphatic polymers, polymerized from alkanes or paraffinic hydrocarbons. More particularly, materials such as high molecular weight polyethylenes, including High Density Polyethylene (HDPE) and Ultra-High Molecular Weight polyethylene (UHMW), and polypropylene are preferred, though other materials, whether polymerized alkanes or not, may be found to be completely adequate and suitable for a particular application. Preferred embodiment hunting tool 100, which is configured for deer and the like animals, may be cut from sufficiently thick sheet stock, injection molded, or formed using any other suitable fabrication technique.

A variety of designs have been contemplated for hunting tool 100. The generally parallelepiped geometry of bar 130 illustrated herein is preferred for manufacturing and business reasons, but a rounded, square, oblong or even artistic geometry may be used for bar 130. In the preferred embodiment hunting tool 100, the edges of hunting tool 100, particularly adjacent to bar 130 and notches 132, 134, may desirably be gently contoured or chamfered to avoid the presence of uncomfortable sharp edges that arise from perpendicular or otherwise sharply and suddenly diverging surfaces. Similarly, any of a wide variety of other shapes may be quite suitable for bifurcated braces 110. In the preferred embodiment hunting tool 100, the gently curved ends of bifurcated braces 110 enable ready placement within the carcass, with less chance of snagging or interference therewith, and also ensure that hunting tool 100 may be safely carried during a hunt without risk of injury to the hunter. Furthermore, while the present invention is most suited for deer carcasses, any variety of animals may be braced open as well.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A hunting tool having in combination a rip spreader and an indeterminate length rope enabling both rib spreading and carcass transport, said rib spreader comprising
    a longitudinally extensive body region having at least one rope anchor; and
    a pair of bifurcated carcass-engaging braces distal from each other and generally terminating said longitudinally extensive body region.

2. The hunting tool of claim 1, wherein said at least one rope anchor further comprises a first hole passing through said longitudinally extensive body region adjacent to a first one of said pair of bifurcated carcass-engaging braces and a second hole passing through said longitudinally extensive body region adjacent to a second one of said pair of bifurcated carcass-engaging braces.

3. The hunting tool of claim 1, further comprising a contoured hand grip within said longitudinally extensive body region.

4. The hunting tool of claim 3, wherein said contoured hand grip further comprises a plurality of notches formed in said longitudinally extensive body region, each one of said plurality of notches contoured operatively to exclusively contain a single human digit, and each area between adjacent notches operative to separate adjacent human digits.

5. The hunting tool of claim 3, wherein said contoured hand grip further comprises a conformal material overmolded about said longitudinally extensive body region.

6. The hunting tool of claim 1, wherein said rib spreader consists essentially of an alkane hydrocarbon polymer.

7. The hunting tool of claim 1, wherein said rib spreader consists essentially of a high molecular weight polyethylene.

8. A rib spreader, comprising:
    a unitary body;
    a longitudinally extensive body region within said unitary body having at least one rope anchor; and
    a pair of bifurcated carcass-engaging braces within said unitary body distal from each other and generally terminating said longitudinally extensive body region.

9. The rib spreader of claim 8, wherein said at least one rope anchor further comprises a first hole passing through said longitudinally extensive body region adjacent to a first one of said pair of bifurcated carcass-engaging braces and a second hole passing through said longitudinally extensive body region adjacent to a second one of said pair of bifurcated carcass-engaging braces.

10. The rib spreader of claim 8, further comprising a contoured hand grip having a plurality of notches formed within said longitudinally extensive body region, each one of said plurality of notches contoured operatively to exclusively contain a single human digit, and each area between adjacent notches operative to separate adjacent human digits.

11. The rib spreader of claim 10, wherein said contoured hand grip further comprises a conformal material overmolded about said longitudinally extensive body region.

12. The rib spreader of claim 8, wherein said rib spreader unitary body consists essentially of an alkane hydrocarbon polymer.

13. The rib spreader of claim 8, further comprising a rope anchored by said rope anchor and extending from said longitudinally extensive body region.

14. A hunting tool enabling both rib spreading and carcass transport, comprising:
    a unitary body;
    a longitudinally extensive, generally parallelepiped body region within said unitary body;
    a pair of bifurcated carcass-engaging braces within said unitary body distal from each other and generally terminating said longitudinally extensive body region, each one of said bifurcated carcass-engaging braces terminating distal to said longitudinally extensive body region in a pair of gently curved forks;
    a first hole passing through said longitudinally extensive body region adjacent to a first one of said pair of bifurcated carcass-engaging braces;
    a second hole passing through said longitudinally extensive body region adjacent to a second one of said pair of bifurcated carcass-engaging braces; and
    a flaccid cord passing through said first hole, extending away from said longitudinally extensive body region, and passing through said second hole.

15. The hunting tool of claim 14, further comprising a contoured hand grip within said longitudinally extensive body region and between said first and second holes.

16. The hunting tool of claim 15, wherein said contoured hand grip further comprises a plurality of finger notches formed in a first parallelepiped surface of said longitudinally extensive body region, and a single thumb notch formed in a second parallelepiped surface of said longitudinally extensive body opposed to said first parallelepiped surface.

17. The hunting tool of claim 15, wherein said contoured hand grip further comprises a conformal material overmolded about said longitudinally extensive body region.

18. The hunting tool of claim 14, wherein said rib spreader unitary body consists essentially of an alkane hydrocarbon polymer.

19. The hunting tool of claim 14, wherein said rib spreader unitary body consists essentially of a high molecular weight polyethylene.

20. The hunting tool of claim 15, wherein said unitary body comprises a single sheet of material.

\* \* \* \* \*